US012787026B2

(12) United States Patent
Wu et al.

(10) Patent No.: US 12,787,026 B2
(45) Date of Patent: Nov. 3, 2026

(54) METHOD, DEVICE AND TERMINAL FOR MONITORING PDCCH

(71) Applicant: VIVO MOBILE COMMUNICATION CO., LTD., Dongguan (CN)

(72) Inventors: Kai Wu, Dongguan (CN); Lihui Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 302 days.

(21) Appl. No.: 18/377,797

(22) Filed: Oct. 7, 2023

(65) Prior Publication Data

US 2024/0040589 A1 Feb. 1, 2024

Related U.S. Application Data

(63) Continuation of application No. PCT/CN2022/085733, filed on Apr. 8, 2022.

(30) Foreign Application Priority Data

Apr. 8, 2021 (CN) ......................... 202110379712.9

(51) Int. Cl.
*H04W 72/232* (2023.01)
*H04W 72/0453* (2023.01)
*H04W 72/53* (2023.01)

(52) U.S. Cl.
CPC ..... *H04W 72/232* (2023.01); *H04W 72/0453* (2013.01); *H04W 72/53* (2023.01)

(58) Field of Classification Search
CPC ......... H04W 72/20–232; H04W 72/12; H04W 72/1273; H04W 72/23
See application file for complete search history.

(56) References Cited

U.S. PATENT DOCUMENTS

| | | | | |
|---|---|---|---|---|
| 10,448,389 | B1 * | 10/2019 | Seo | H04L 5/0053 |
| 11,589,293 | B2 * | 2/2023 | Dimou | H04L 5/0005 |
| 2019/0223164 | A1 * | 7/2019 | He | H04W 76/27 |
| 2019/0281539 | A1 * | 9/2019 | Takeda | H04W 24/10 |
| 2019/0313437 | A1 * | 10/2019 | Jung | H04L 5/0042 |
| 2020/0045569 | A1 * | 2/2020 | Seo | H04W 72/23 |
| 2020/0120584 | A1 * | 4/2020 | Yi | H04L 5/0048 |

(Continued)

FOREIGN PATENT DOCUMENTS

| | | |
|---|---|---|
| CN | 111294935 A | 6/2020 |
| CN | 111869294 A | 10/2020 |

(Continued)

OTHER PUBLICATIONS

Extended European Search Report issued in related European Application No. 22784125.1, mailed Sep. 23, 2024, 7 pages.

(Continued)

*Primary Examiner* — Brendan Y Higa
(74) *Attorney, Agent, or Firm* — IPX PLLC

(57) ABSTRACT

A method, device, and terminal for monitoring a PDCCH are provided. The method for monitoring the PDCCH includes: determining, by a terminal, a target monitoring resource for monitoring the PDCCH based on first information on a first time unit; where the first information includes configuration information of a subband and/or configuration information of a guardband; monitoring the PDCCH based on the target monitoring resource.

17 Claims, 9 Drawing Sheets

300

(56) References Cited

U.S. PATENT DOCUMENTS

| | | | | |
|---|---|---|---|---|
| 2020/0229008 | A1* | 7/2020 | Islam | H04B 17/309 |
| 2020/0280971 | A1 | 9/2020 | Moon et al. | |
| 2021/0022167 | A1* | 1/2021 | Khoshnevisan | H04W 72/23 |
| 2021/0058970 | A1 | 2/2021 | Kwak et al. | |
| 2021/0092772 | A1* | 3/2021 | Nakashima | H04L 5/001 |
| 2021/0352667 | A1* | 11/2021 | Abotabl | H04L 5/14 |
| 2022/0007395 | A1* | 1/2022 | Lei | H04L 1/0003 |
| 2022/0086029 | A1* | 3/2022 | Abotabl | H04L 27/2605 |
| 2022/0124730 | A1* | 4/2022 | Li | H04W 72/12 |
| 2022/0312380 | A1* | 9/2022 | Chen | H04W 72/02 |
| 2022/0312485 | A1* | 9/2022 | Zhang | H04B 7/06956 |
| 2023/0276457 | A1* | 8/2023 | Wang | H04L 27/2602 370/329 |

FOREIGN PATENT DOCUMENTS

| | | | |
|---|---|---|---|
| WO | 2020040266 | A1 | 2/2020 |
| WO | 2021048588 | A1 | 3/2021 |

OTHER PUBLICATIONS

International Search Report issued in corresponding International Application No. PCT/CN2022/085733, mailed Jun. 28, 2022, 4 pages.

* cited by examiner

METHOD, DEVICE AND TERMINAL FOR MONITORING PDCCH

CROSS-REFERENCE TO RELATED APPLICATIONS

The application is a continuation of International Application No. PCT/CN2022/085733, filed on Apr. 8, 2022, which claims priority to Chinese Patent Application No. 202110379712.9, filed Apr. 8, 2021. The entire contents of each of the above-identified applications are expressly incorporated herein by reference.

TECHNICAL FIELD

The present application is directed to the technical field of wireless communication, and specifically relates to a method, device and terminal for monitoring a PDCCH.

BACKGROUND

In wireless communication networks, especially for full-duplex or flexible-duplex communication networks, it can occur that uplink and downlink transmission directions on different frequency domain resources are different at the same moment. In the case, if a monitoring resource corresponding to a Physical Downlink Control CHannel (PDCCH) (or a COntrol REsource SET (CORESET)) is overlapped with other resources other than the monitoring resource, the effective monitoring of the PDCCH cannot be realized.

SUMMARY

An embodiment of the present application provides a method, device, and terminal for monitoring a PDCCH.

According to a first aspect, an embodiment of the present application provides a method for monitoring a PDCCH, including: determining, by a terminal, a target monitoring resource for monitoring the PDCCH based on first information on a first time unit; where the first information includes configuration information of a subband and/or a configuration information of a guardband; monitoring the PDCCH based on the target monitoring resource.

In a second aspect, an embodiment of the present application provides a device for monitoring a PDCCH, including: a determining module, configured to determine a target monitoring resource for monitoring the PDCCH based on first information on a first time unit; where the first information includes a configuration information of a sub-band and/or a configuration information of a guardband; a monitoring module, configured to monitor the PDCCH based on the target monitoring resource.

According to a third aspect, an embodiment of the present application provides a terminal, including a processor, a memory, and a program or instructions stored on the memory and executed on the processor. The program or the instructions, when executed by the processor, implement the steps of the method according to the first aspect.

According to a fourth aspect, an embodiment of the present application provides a terminal, including a processor and a communication interface. The communication interface is coupled to the processor. The processor is configured to run a program or instructions to implement the method according to the first aspect.

According to a fifth aspect, an embodiment of the present application provides a readable storage medium on which a program or instructions are stored. The program or the instructions, when executed by a processor, implements steps of the method according to the first aspect.

According to a sixth aspect, an embodiment of the present application provides a chip, including a processor and a communication interface. The communication interface is coupled to the processor. The processor is configured to run a program or instructions to implement the method according to the aspect.

According to a seventh aspect, an embodiment of the present application provides a computer program or a computer program product stored in a non-volatile storage medium. The program/the program product is implemented by at least one processor to implement the steps of the method according to the first aspect.

In an embodiment of the present application, the terminal determines a target monitoring resource for monitoring the PDCCH based on the configuration information of the subband on the first time unit and/or the configuration information of the guardband. Therefore, it is possible to enable the terminal to monitor the PDCCH based on the available target monitoring resource, avoiding the problem of not being able to monitor the PDCCH effectively due to the overlapping of the monitoring resource corresponding to the PDCCH with other resources other than the monitoring resource, and ensuring wireless communication performance.

DETAILED DESCRIPTION

The following describes the embodiments of the present application in conjunction with the drawings in the embodiments of the present application. Obviously, the described embodiments are a portion of the embodiments of the present application, rather than all embodiments. All other embodiments obtained by a person skilled in the art based on the embodiments of the present application fall within the protection scope of the present application.

The terms "first" and "second" in the specification and claims of the present application are used to distinguish similar objects, but are unnecessarily used to describe a specific sequence or order. It is to be understood that the terms so used are interchangeable where appropriate, so that embodiments of the present application can be performed in an order other than those illustrated or described herein. The objects distinguished by "first" and "second" are usually of one class and the number of objects is not limited, for example a first object can be one or more. In addition, "and/or" used in the specification and the claims represents at least one of the connected objects. A character "/" generally indicates that the related objects in the context are an "or" relationship.

It is to be pointed out that the technologies described in the present application are not limited to a Long Term Evolution (LTE) system and an LTE-Advanced (LTE-A) system, and can further be applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems. The terms "system" and "network" in an embodiment of the present application are often used interchangeably. The technologies described can be used both for the systems and radio technologies mentioned above and for other systems and radio technologies. The following description describes a New Radio (NR) system for an exemplary purpose and uses NR terms throughout most of the following description, but these technologies can also be applied to applications other than NR system applications, such as a 6th-Generation (6G) communication system.

Figure 1:
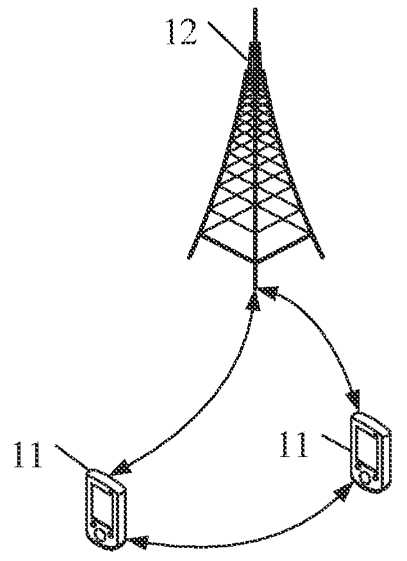
FIG. 1 is a block diagram of a wireless communication system according to some embodiments of the present application.

FIG. 1 is a block diagram of a wireless communication system applicable according to an embodiment of the present application. The wireless communication system includes a terminal 11 and a network side apparatus 12. A terminal 11 can also be called a terminal apparatus or a User Equipment (UE). The terminal 11 can be a mobile phone, a Tablet Personal Computer, a Laptop Computer (also known as a notebook computer), a Personal Digital Assistant (PDA), a palm computer, a netbook, an Ultra-Mobile Personal Computer (UMPC), Mobile Internet Device (MID), a wearable device or a Vehicle User Equipment (VUE), a Pedestrian User Equipment (PUE) and other end-side devices. The wearable device includes: a smart watch, a bracelet, a headphone, glasses, etc. The specific type of the terminal 11 is not limited in an embodiment of the present application. The network side apparatus 12 can be a base station or a core network. The base station can be referred to as a NodeB, an Evolved NodeB, an access point, a Base Transceiver Station (BTS), a radio base station, a radio transceiver, a Basic Service Set (BSS), an Extended Service Set (ESS), a node B, an evolved node B (eNB), a home node B, a home evolved node B, a WLAN access point, a Wi-Fi node, a Transmitting Receiving Point (TRP), or some other suitable terms in the art. As long as the same technical effect is achieved, the Base Station is not limited to a specific technical vocabulary. Only a 5G base station is used as an example in an embodiment of the present application, but a specific type of the base station is not limited.

The following is a detailed description of the technical solution provided by an embodiment of the present application through some embodiments and their application scenarios in combination with the drawings.

Figure 2:
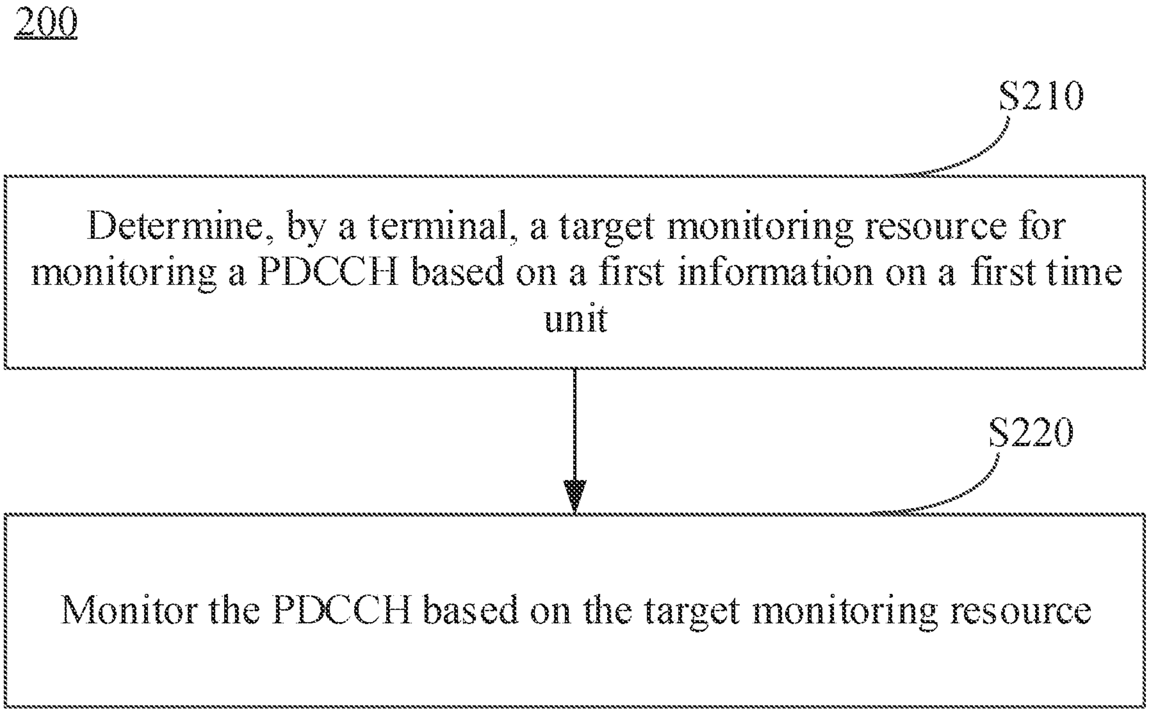
FIG. 2 is a flowchart of a method for monitoring a PDCCH according to some embodiments of the present application.

FIG. 2 is a flowchart of a method 200 for monitoring a PDCCH provided in one example embodiment of the present application. The method 200 can, but is not limited to, be performed by a terminal, and specifically can be performed by a hardware and/or software mounted in the terminal. In the embodiment, the method 200 can include at least the following steps.

S210: determining, by the terminal, a target monitoring resource for monitoring the PDCCH based on first information on a first time unit.

The first time unit is configured for a time unit for monitoring the PDCCH, such as a symbol, a time slot, a sub-time slot, a sub-frame and so on. In the embodiment, the first time unit can be configured by a protocol agreement or high-layer signaling, etc., without limitation herein.

The first information includes configuration information of a subband and/or configuration information of a guardband. It can be understood that in a case of a full duplex or a flexible duplex of a network, a guardband is introduced between uplink and downlink frequency domain resources to avoid interference between an uplink and a downlink. For example, the guardband for paired spectrum is a protection interval between an uplink carrier and a downlink carrier. In another example, for unpaired spectrum, different subbands have different transmission directions within the same time unit. It is also necessary to introduce the protection interval within the subband, i.e., to introduce a guardband between the subbands within the carrier.

In the embodiment, to realize the determination of the target monitoring resource, the configuration information of the subband can include direction information and/or size information of the subband, e.g., the direction information of the subband can be uplink, downlink, or flexible, i.e., the subband can be an uplink subband, a downlink subband, or a flexibly configured subband. In one realization method, the subband can include a plurality of contiguous Resource Blocks (RBs) or Resource Elements (REs), and can also be described by an RB set or an RE set.

The configuration information of the guardband can include position information and/or size information of the guardband. It is to be understood that the guardband represents a frequency domain resource in which the terminal does not transmit or receive a signal. The guardband can be described by an RB number or an RE number, and an RB position or an RE position.

The direction information or the size information of the subband can be different at different time units. The size information or the position information of the guardband can also be different. For example, the subband configuration of an all-uplink subband or an all-downlink subband at a given time unit does not need the guardband. In another example, at a given time unit, there can be a mixed configuration of the uplink subband, the downlink subband, and a flexible subband. One or more guardbands need to be configured between the subbands.

In one realization method, the direction information of the foregoing subband can be indicated by high-layer signaling, Media Access Control-Control Element (MAC-CE), Downlink Control Information (DCI), and the like.

Further, the target monitoring resource determined by the terminal based on the first information can include a resource corresponding to at least one of a CORESET, a Search Space (SS), and a SS set.

It is understood that a network side apparatus can configure the plurality of CORESETs for the terminal, each of which can include a consecutive number of symbols, a frequency domain resource, a pre-coding granularity, an interleaving type, a DeModulation Reference Signal (DMRS) mapping mode etc., and each of which can in turn be configured with a plurality of SSs. The terminal monitors the PDCCH in the plurality of SSs. The configuration of the SS can include an aggregation level for monitoring the PDCCH, a period and an offset value (for determining a monitoring occasion, and so on.

S220: monitoring the PDCCH based on the target monitoring resource.

The terminal monitors an implementation process of the PDCCH based on a target monitoring resource (e.g., the CORESET, the SS, the SS set), without limitation herein.

In the embodiment, the terminal determines the target monitoring resource for monitoring the PDCCH based on the configuration information of the subband on the first time unit and/or the configuration information of the guardband. Therefore, it is possible to enable the terminal to monitor the PDCCH based on the available target monitoring resource, avoiding the problem of not being able to monitor the PDCCH effectively due to the overlapping of the monitoring resource corresponding to the PDCCH with other resources other than the monitoring resource, and ensuring wireless communication performance.

Figure 3A:
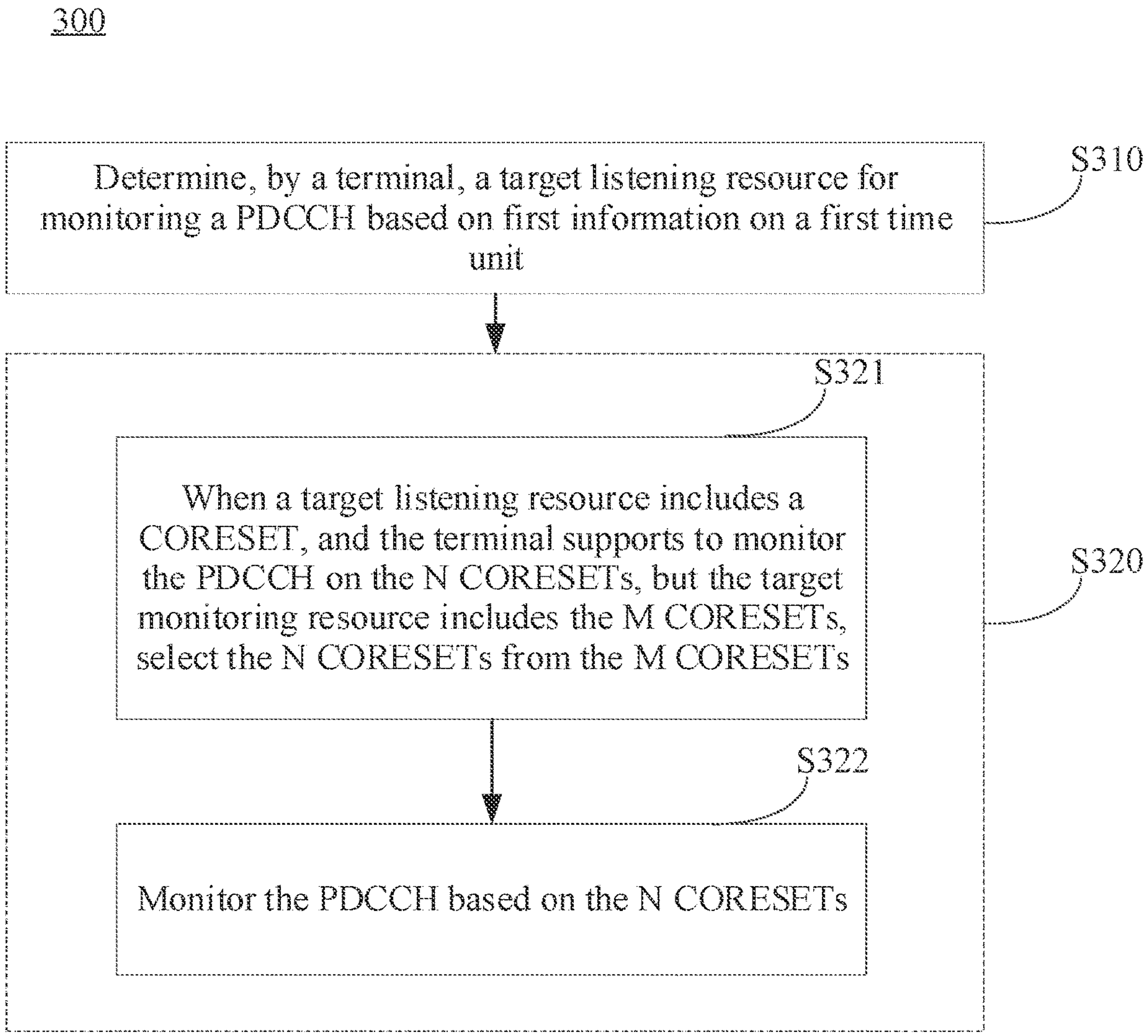
FIG. 3*a* is a flowchart of a method for monitoring a PDCCH according to some embodiments of the present application.

FIG. 3*a* is a flowchart of a method 300 for monitoring a PDCCH provided in one example embodiment of the present application. The method 300 can, but is not limited to, be performed by a terminal, and specifically can be performed by a hardware and/or software mounted in the terminal. In the embodiment, the method 300 can include at least the following steps.

S310: determining, by the terminal, a target monitoring resource for monitoring the PDCCH based on a first information on a first time unit.

The first information includes a configuration information of a subband and/or a configuration information of a guardband.

It is to be understood that the realization process of S310, in addition to the description that can be referred to in the preceding method embodiment 200, is taken as a possible realization method in which the target monitoring resource can satisfy the following (1) and/or (2).

(1) The target monitoring resource is not overlapped with a first subband. The first subband includes an uplink subband and/or a flexibly configured subband. In other words, a frequency domain resource corresponding to the target monitoring resource (e.g., a CORESET, an SS set(s), and an SS) is not overlapped with a first uplink subband or a first flexible subband.

For example, in a case in which the target monitoring resource is the CORESET, if a portion of the frequency domain resource of the CORESET is overlapped with the first uplink subband or the first flexible subband. However, a frequency domain resource of one SS #x in the SS set associated with the CORESET is not overlapped with the first uplink subband or the first flexible subband. The terminal can monitor the PDCCH on the SS #x. #x denotes an index of the SS.

In one implementation, a network side apparatus can only configure the CORESET on a downlink subband or a flexible subband.

(2) The target monitoring resource is not overlapped with a first guardband. In other words, the frequency domain resource corresponding to the target monitoring resource (for example, the CORESET, the SS set(s), and the SS) is not overlapped with the first guardband.

In the embodiment, the first subband and/or the first guardband described in the preceding (1) and (2) can be configured by the network side apparatus for the determination of the target monitoring resource.

If the terminal determines to monitor the PDCCH at the first time unit according to the configuration of the SS, the SS can be associated to the CORESET. That is, in a case in which target monitoring parameters include the CORESET and SS, the SS is associated with the CORESET.

S320: monitoring the PDCCH based on the target monitoring resource.

It can be understood that the realization process of S320, in addition to being referable to the relevant description in the method embodiment 200, as a possible realization method, can also include S321 and S322 shown in FIG. 3*a* as follows.

S321: in cases in which the target monitoring resource includes the CORESET, the terminal supports to monitor the PDCCH on the N CORESETs, but the target monitoring resource includes the M CORESETs, selecting the N CORESETs from the M CORESETs, where N<M.

In the embodiment, a process of the terminal for selecting the N CORESETs from the M CORESETs can include at least one of the following (1) to (4).

(1) Based on an index value of each of the CORESETs, selecting the N CORESETs having a first index value from the M CORESETs.

The first index value can be N largest index values or N smallest index values in the plurality of index values, and the like.

For example, assuming that N is 2 and M is 4, and the M index values are a, b, c, and d, with a<b<c<d, the N largest index values can be c and d. That is, the N CORESETs selected from the M CORESETs are the CORESETs with the index values of c and d, respectively. Accordingly, the N smallest index values can be a and b. That is, the N CORESETs selected from the M CORESETs are the CORESETs with index values of a and b, respectively.

(2) Based on the number of resources included in each of the CORESETs, the number of resources including the number of RBs and/or the number of symbols, selecting the N CORESETs with the highest number of resources from the M CORESETs.

It is assumed that M is 4 and N is 2, and the number of resources in the 4 CORESETs are a, b, c, and d, respectively, with a<b<c<d. Then the N CORESETs selected from the M CORESETs are the CORESETs including the number of c resources and the number of d resources, respectively.

(3) Based on the index value of the SS associated with each of the CORESETs, selecting the N CORESETs associated with the SS having the second index value from the M CORESETs.

Similar to the foregoing first index value, the second index value can be the N largest index values or the N smallest index values in the plurality of index values. Accordingly, the process of selecting the N CORESETs based on the index values of the SS associated with the CORESETs is similar to the selection process in the foregoing (1). This is not repeated herein.

(4) Based on the type of a search space of each of the CORESETs, selecting the N CORESETs from the M CORESETs, where a CORESET configured with a Common Search Space (CSS) configuration is prioritized with respect to a CORESET configured with a UE-specific Search Space (USS) configuration.

For example, it is assumed that M is 4 and N is 3, and that the 4 CORESETs include the 2 CORESETs configured with CSS configuration and 2 CORESETs configured with USS configuration. Then the 2 CORESETs configured with the CSS configuration are preferentially selected, and the 1 CORESET is selected from the 2 CORESETs configured with the USS configuration. It can be understood that when the terminal selects the 1 CORESET from the 2 CORESETs configured with the USS configuration, the terminal can select the CORESET based on the index size of the CORESET, the index size of the SS associated with the CORESET, and the number of resources included in the CORESET. There is no restriction herein.

In the embodiment, in a case in which the number of CORESETs selected from the M CORESETs based on the type of the search space of each of the CORESETs is X, with M>X>N, if the terminal can further perform at least one of the following (4a) to (4c) so as to further select the N CORESETs from the X CORESETs.

(4a) Based on the index value of each of the CORESETs, selecting N CORESETs having a first index value from the X CORESETs.

(4b) Based on the number of resources included in each of the CORESETs, selecting the N CORESETs with the highest number of resources from the X CORESETs.

(4c) Based on the index value of the SS associated with each of the CORESETs, selecting the N CORESETs associated with the SS having the second index value from the X CORESETs.

The process of realizing (4a) to (4c) can be referred to the relevant descriptions in the preceding (1) to (3), which is not repeated here.

Furthermore, in a case in which the number of the CORESETs configured with the CSS configuration in the M CORESETs is Y, with M>Y>N, the terminal can select the N CORESETs from the Y CORESETs in predetermined priority orders. The predetermined priority orders include any one of (a)-(c) below.

(a) a first CORESET>a second CORESET>a third CORESET>a fourth CORESET>a fifth CORESET.

(b) the first CORESET>the third CORESET>the fourth CORESET>the second CORESET>the fifth CORESET.

(c) the first CORESET>the third CORESET>the second CORESET>the fourth CORESET>the fifth CORESET.

In the foregoing (a)-(c), the first CORESET is a CORESET associated with Type 0 CSS, and the second CORESET is a CORESET associated with Type 1 CCS. The third CORESET is a CORESET associated with Type 0A CSS. The fourth CORESET is a CORESET associated with Type 2 CSS. The fifth CORESET is a CORESET associated with Type 3 CSS.

The foregoing predetermined priority orders can be different depending on the different CORESETs, and the embodiment is not limited thereto.

S322: monitoring the PDCCH based on the N CORESETs.

Figure 3B:
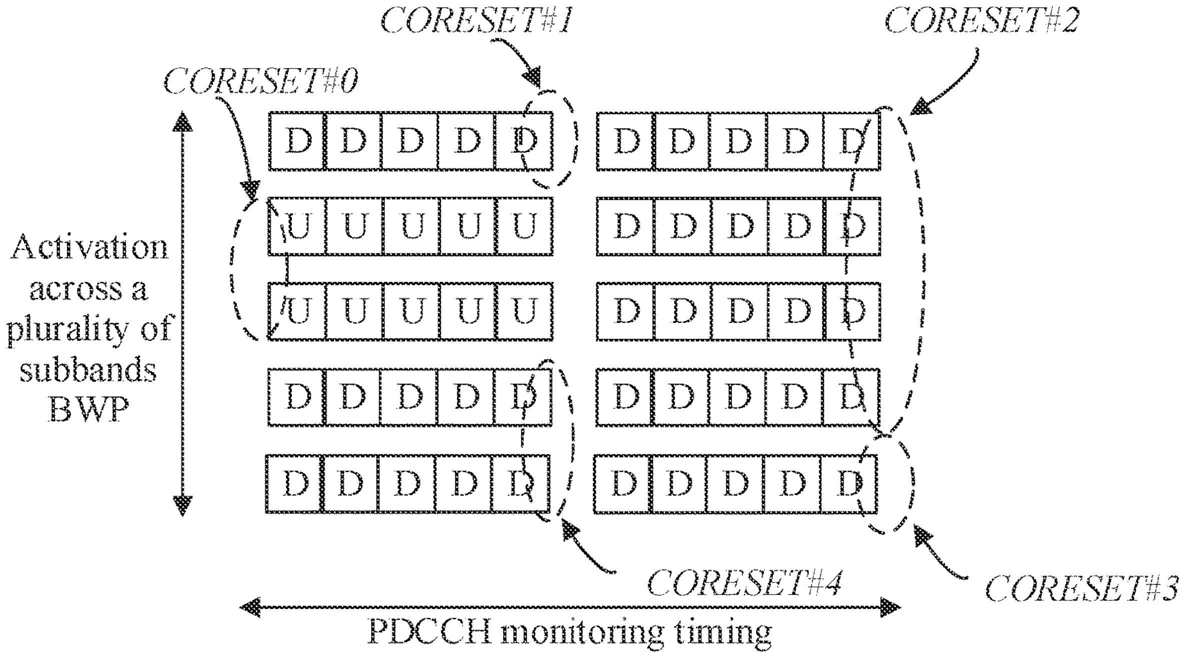
FIG. 3*b* is a schematic diagram of a monitoring resource according to some embodiments of the present application.

Based on the foregoing description of the method embodiment 300, the process of realizing the method embodiment 300 is further described below in connection with examples for ease of understanding as follows. As shown in FIG. 3*b*, U denotes an uplink, and D denotes a downlink.

It is assumed that the plurality of CORESETs are configured by the network side apparatus, such as CORESET #0-4. At least one SS is configured on each of the CORESETs. Then the terminal determines the target monitoring resource, such as the CORESET, based on direction information of the subband on each of the time units (i.e., the first time unit described above), such as the uplink and the downlink.

Referring to FIG. 3*b*, (the CORESET in FIG. 3*b* is only for the purpose of making a schematic representation of the frequency domain resource, and the specific monitoring occasion is determined according to the configuration of the SS), the terminal needs to monitor the PDCCH on the plurality of CORESETs/SS sets on a PDCCH monitoring occasion. Based on the direction information of the subband, the CORESET or the SS set for monitoring the PDCCH is determined.

It is assumed that a search space configuration is included in all CORESET #0-4, so that PDCCH monitoring is required on the monitoring occasion. In FIG. 3*b*, on the PDCCH monitoring occasion, within the frequency domain resource (also understood as a bandwidth) corresponding to CORESET #0, because of the presence of the uplink subband/guardband, the terminal does not perform the PDCCH monitoring on the CORESET #0, whereas if the SS Set associated with the CORESET #1/3/4 is also configured to monitor the PDCCH in the current time unit and is included in the downlink subband, the terminal monitors the PDCCH on these CORESET #1/3/4.

In one realization method, if the terminal can only support the PDCCH monitoring performed on the N (e.g., 2) CORESETs, the terminal can further select the 2 CORESETs from the plurality of CORESETs for monitoring the PDCCH in accordance with the manner described in any one of (1) to (4) below.

(1) The 2 CORESETs with the smallest CORESET index are selected for monitor, that is, the CORESET #1,3.

(2) The 2 CORESETs that include the highest number of resources (i.e., the largest bandwidth) are selected for monitor, i.e., the CORESET #1,4.

(3) Monitoring is performed according to the type of SS, e.g., monitoring is performed on the CORESET configured for CSS monitor, e.g., if the CORESET #3,4 is configured for PDCCH monitoring of the CSS, and the CORESET #1 has only USS monitor, the terminal monitors the PDCCH on the CORESET #3,4.

In some implementations, regarding the plurality of CSSs, the CSSs can also be prioritized based on the type of the CSS, such as Type0> . . . >Type3, as described in detail in the method embodiment 300.

(4) Monitoring is performed according to the CORESETs associated with the SS with the smallest index value, e.g., if the CORESET #1 is configured with searchspace #1, the CORESET #3 is configured with searchspace #3, and the CORESET #4 is configured with the monitoring of searchspace #2, the terminal monitors the PDCCH on the CORESET #1,4.

The terminal determines a CORESET(s)/SS set(s) for monitoring based on a time period that may include one or more time units. The terminal monitors only the CORESET(s)/SS set(s) that are valid (available) at all the monitoring occasions during the time period. In some implementations, a reference moment is defined within the time period, the CORESET(s)/SS set(s) to be monitored is determined based on the reference moment, and the same CORESET(s)/SS set(s) is monitored throughout the period.

In the embodiment, in a case in which a plurality of groups of CORESET configurations are configured by the network side apparatus, the terminal can further determine available CORESET configurations from the plurality of CORESET configurations and monitor the PDCCH, thereby further realizing effective monitoring of the PDCCH.

Figure 4A:
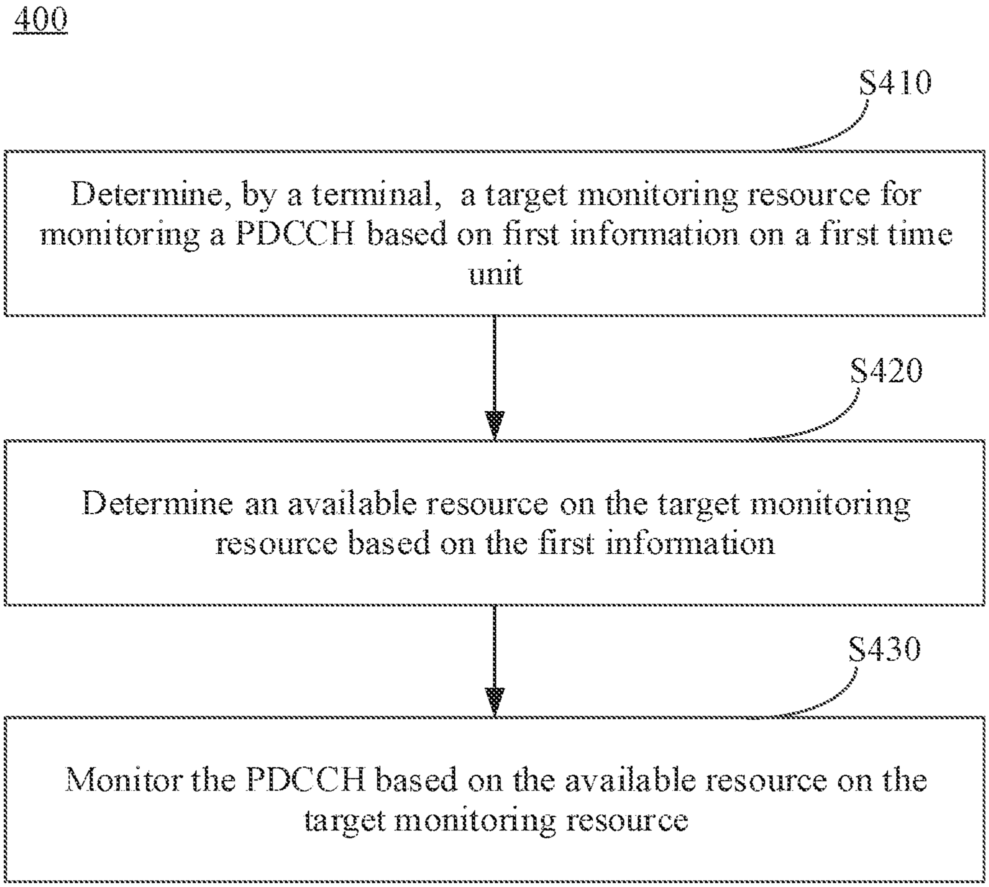
FIG. 4*a* is a flowchart of a method for monitoring a PDCCH according to some embodiments of the present application.

FIG. 4*a* is a flowchart of a method 300 for monitoring a PDCCH provided in one example embodiment of the present application. The method 400 can, but is not limited to, be performed by a terminal, and specifically can be performed by a hardware and/or software mounted in the terminal. In the embodiment, the method 400 can include at least the following steps.

S410: determining, by the terminal, a target monitoring resource for monitoring the PDCCH based on first information on a first time unit.

The first information includes configuration information of a subband and/or configuration information of a guardband.

It can be understood that the process of realizing S410 can be referred to the relevant descriptions in the preceding method embodiment 200 or 300. This is not repeated herein.

S420: based on the first information, determining an available resource on the target monitoring resource.

In one realization method, the terminal can determine the available resource in any one of the following ways (1) and (2).

(1) Regarding the target monitoring resource, there is no unavailable resource in a predetermined number of consecutive resource blocks starting with a resource block with an index value of a, where a satisfies mod ($RB_{idx}$, b)=0, $RB_{idx}$ denotes an index value of the resource block, and b denotes the predetermined number. The predetermined number can be configured by a protocol agreement or high-layer signaling. This is not limited herein.

In some implementations, if any one of the resource blocks (e.g., REs or RBs) within the 6 RBs starting from $RB_{idx}$=n is the unavailable resource, these 6 resource blocks are frequency domain resources that cannot be used as the PDCCH monitoring in the target monitoring resource, i.e., these 6 resource blocks are the unavailable resource, and the n satisfies the $RB_{idx}$ of mod($RB_{idx}$,6)=0.

(2) There is no unavailable resource in the target monitoring resource.

For example, if any one of the target monitoring resources (e.g., RB or RE) is unavailable, the target monitoring resource is the unavailable resource.

In the preceding (1) and (2), it is determined whether one target monitoring resource (e.g., the CORESET, and the SS set) is monitored. If any one of the SS set/PDCCH candidates is overlapped with the unavailable resource, no monitoring is performed on the CORESET/the SS set.

Furthermore, as a possible realization method, in addition to the preceding (1) and (2), it is determined whether the target monitoring resource (e.g., the CORESET, and the SS set) is monitored. It can be possible to determine the target monitoring resource to be the available resource if one of the SS sets/the PDCCH candidates is in the available resource. The PDCCH is subsequently monitored on the target monitoring resource.

S430: monitoring the PDCCH based on the available resource on the target monitoring resource.

It can be understood that as a possible realization method, in addition to being referable to the relevant description in the preceding method embodiment 200 or 300, the process of realizing S430 can include: determining a PDCCH candidate resource in the target monitoring resource based on a set of the available resources on the target monitoring resource; monitoring the PDCCH based on the PDCCH candidate resource.

For example, the granularity of determining whether the target monitoring resource is available by a subband can be 50 RBs. However, it is 6 RBs that determine whether a PDCCH candidate is available. It can happen that 1 of the RBs is unavailable, and the other 5 RBs are available. Then from the perspective of the PDCCH, none of the 6 RBs are available. However, if the availability of the target monitoring resource is described from the perspective of the RB, it is possible that the RB is not available because there is an RE in the RB that is not available.

If there is not the RE as an unavailable resource in the PDCCH candidate resource, the PDCCH is monitored based on the PDCCH candidate resource. The PDCCH candidate resource is not monitored in a case there is the RE as the unavailable resource in the PDCCH candidate resource.

Further, in a case in which at least a portion of the target monitoring resources corresponds to monitoring timing and/or a frequency domain resource whose transmission direction is downlink, at least a portion of the monitoring resources includes at least one of (1) to (3) below.

(1) A CORESET with an index #0.

(2) A CORESET for Beam Failure Recovery (BFR).

(3) A CORESET associated with a specified type CSS. The specified type CSS includes at least one of Type 0 CSS, Type 0A CSS, Type 1 CSS, and Type 2 CSS.

For the CORESET in the preceding (1) to (3), it can be understood: If the CORESET with the index #0, the CORESET for the beam failure recovery, or the CORESET associated with the specified type CSS is configured, the corresponding monitoring resource is always downlink, and the terminal always monitors the PDCCH.

Further, based on the foregoing description of the method embodiment 400, the process of realizing the method embodiment 400 is further described below in connection with examples for ease of understandings.

The terminal determines the available resource in the CORESET based on the configuration information of the subband (e.g., the direction information) and/or the configuration information of the guardband, which can include the following Manner I and Manner II.

Figure 4B:
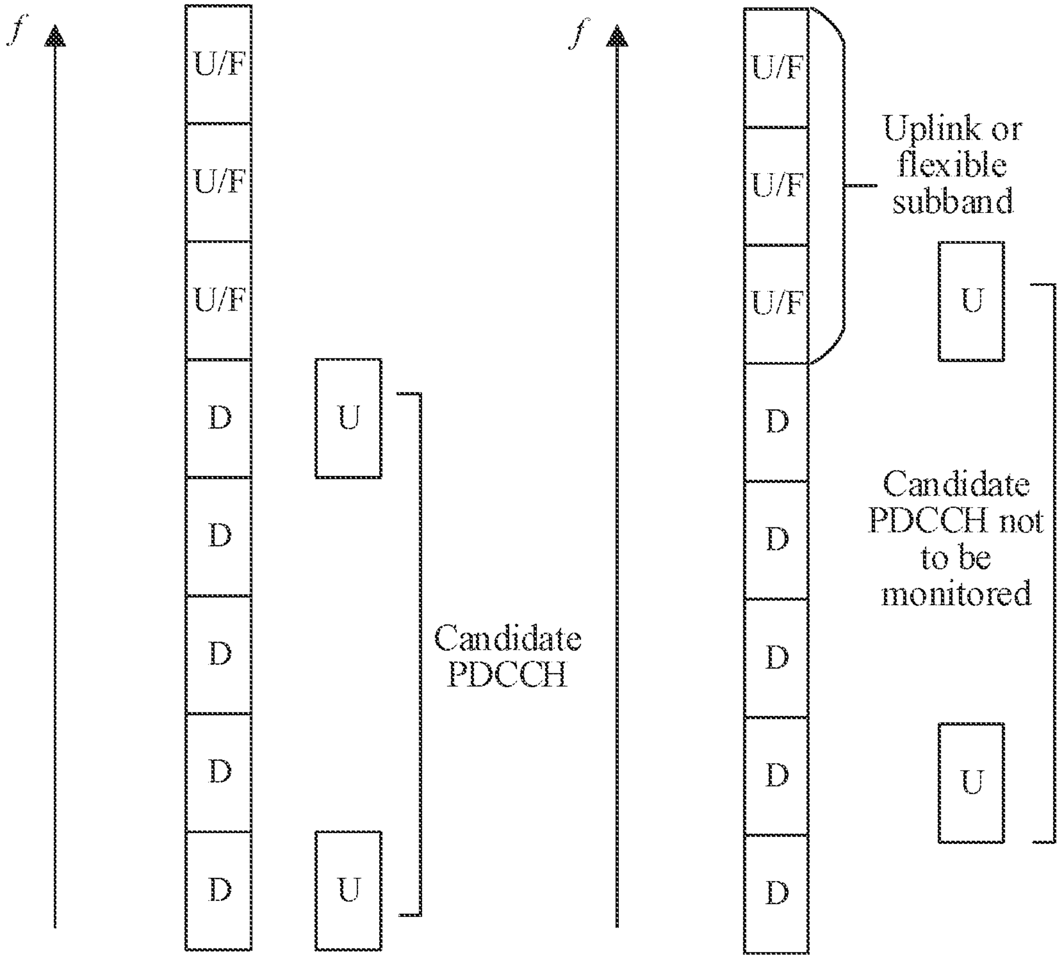
FIG. 4*b* and FIG. 4*c* are schematic diagrams of two different monitoring resources according to some embodiments of the present application.

Manner I: Referring to FIG. 4*b*, the terminal determines the available RBs and REs based on the configuration information of the subband or a configuration information of a guardband. If any one of the REs in the PDCCH candidate is the unavailable resource, the terminal does not monitor the PDCCH candidate.

It is understood that in Manner 1, without changing the configuration of the CORESET and a way that the terminal maps the resource for the PDCCH at the CORESET, the terminal monitors on the PDCCH candidate only when all the REs of the PDCCH candidate are available.

Figure 4C:
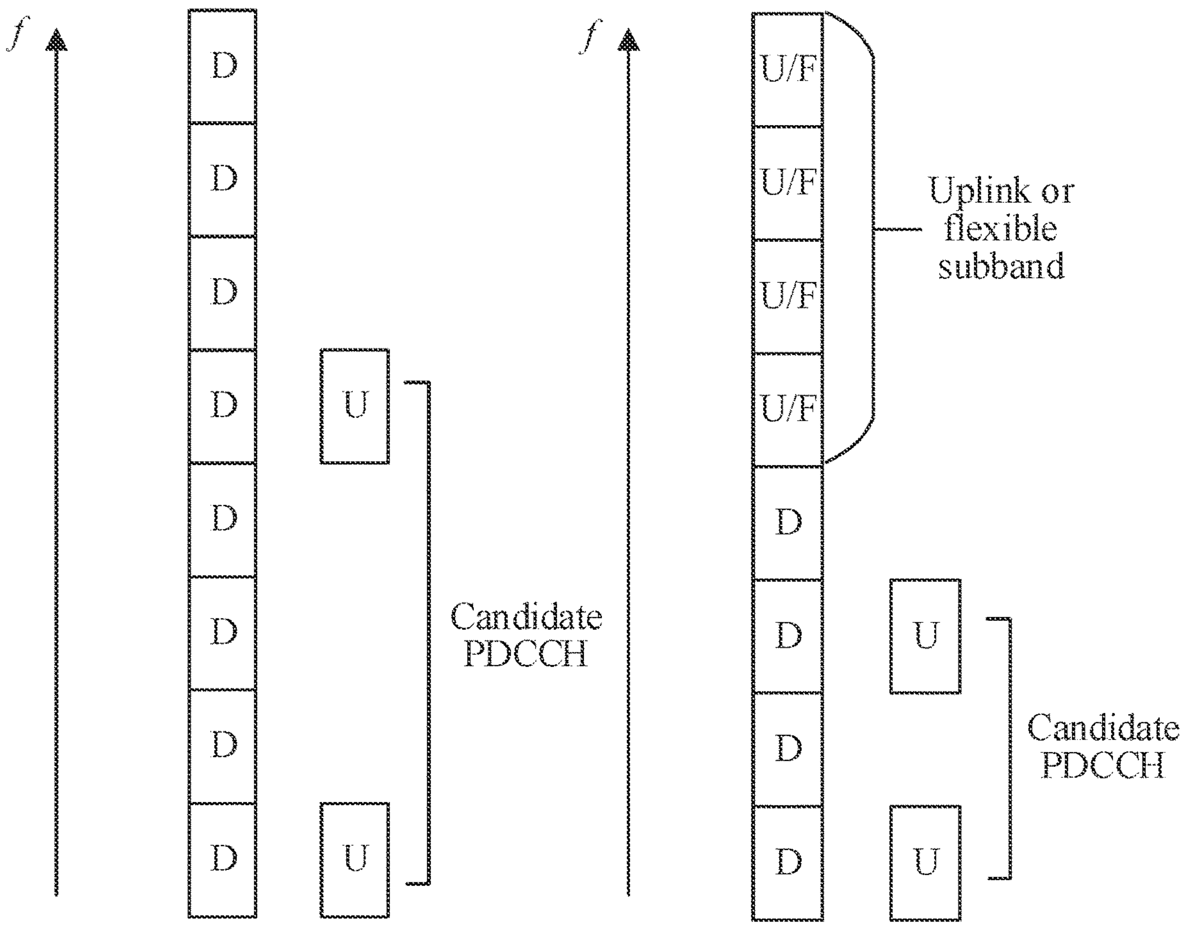

Manner II: Referring to FIG. 4*c*, when configuration information (e.g., direction information) of a terminal root subband, and/or, the configuration information of a guardband determines the available RBs and REs, and when the terminal excludes these unavailable RBs when determining the RB resource of the CORESET. For example, the terminal further excludes the following RBs as unavailable resource, i.e., the 6 RBs are unavailable CORESET resource if any RE within the 6 RBs starting from $RB_{idx}$=n is unavailable. The n satisfies $RB_{idx}$ of mod($RB_{idx}$,6)=0.

After excluding these unavailable RB resources, the network side apparatus can perform PDCCH candidate mapping based on the available RB resource. The terminal also monitors the PDCCH based on a PDCCH mapping method corresponding to the available resource.

Therefore, it can be understood that in Manner II, only the available RB resource is selected from the set of resources of the CORESET configured by a network for the mapping of the PDCCH candidate, i.e., a way of mapping the resource of the PDCCH is changed so as to realize the effective monitoring of the PDCCH.

In the embodiment, the terminal monitors the PDCCH based on whether the RE in the PDCCH candidate is the available resource, and/or, the terminal determines a PDCCH resource mapping method based on the available resource and monitors the PDCCH. Therefore, useless PDCCH monitoring because of the unavailable resource is avoided. Also, with a PDCCH monitoring mechanism given in the embodiment, the network side apparatus can be more flexible in PDCCH transmission.

Regarding the methods 200-400 for monitoring the PDCCH provided in embodiments of the present application, an executing body can be a device for monitoring the PDCCH or a control module for executing the method for monitoring the PDCCH in the device for monitoring the PDCCH. Taking as an example the device for monitoring the PDCCH in an embodiment of the present application to perform the method of monitoring the PDCCH, the device for monitoring the PDCCH provided in an embodiment of the present application is described.

Figure 5:
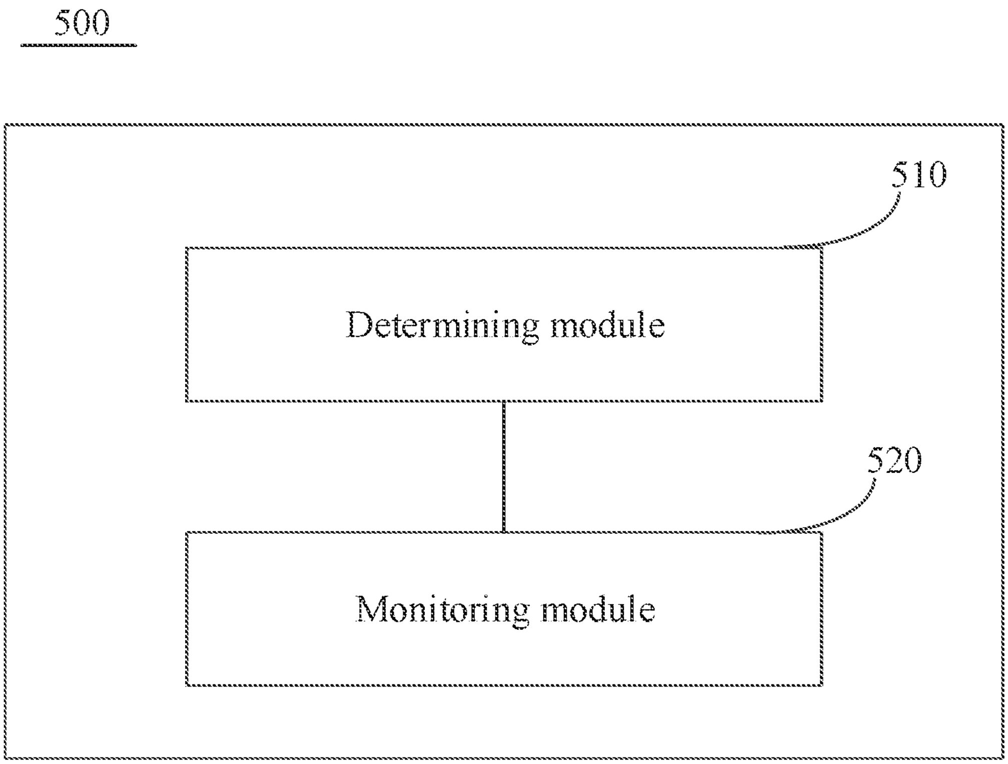
FIG. 5 is a block diagram of a device for monitoring a PDCCH according to some embodiments of the present application.

FIG. 5 shows a block diagram of a device 500 for monitoring a PDCCH provided in an example embodiment of the present application. The device 500 includes: a determining module 510, configured to determine a target monitoring resource for monitoring the PDCCH based on first information on a first time unit; where the first information includes configuration information of a subband and/or configuration information of a guardband; a monitoring module 520, configured to monitor the PDCCH based on the target monitoring resource.

In some implementations, the target monitoring resource includes a resource corresponding to at least one of a CORESET, an SS, and an SS set.

In some implementations, the configuration information of the subband includes direction information and/or size information of the subband. The configuration information of the guardband includes position information and/or size information of the guardband.

In some implementations, the target monitoring resource satisfies at least one of the following: the target monitoring resource is not overlapped with a first subband. The first subband includes an uplink subband and/or a flexibly configured subband; the target monitoring resource is not overlapped with a first guardband.

In some implementations, the first subband and/or the first guardband are configured by a network side apparatus.

In some implementations, in cases in which the target monitoring resource includes the CORESET, and the terminal supports to monitor the PDCCH on the N CORESETs, but the target monitoring resource includes the M CORESETs, the monitoring module is configured to select the N CORESETs from the M CORESETs, where N<M. The monitoring module is configured to monitor the PDCCH based on the N CORESETs.

In some implementations, the monitoring module 520 is configured to perform at least one of the following: based on an index value of each of the CORESETs, select the N CORESETs having a first index value from the M CORESETs; based on the number of resources included in each of the CORESETs, select the N CORESETs with the highest number of resources from the M CORESETs. The number of resources includes the number of resource block RBs and/or the number of symbols, based on an index value of a SS associated with each of the CORESETs, select the N CORESETs associated with the SS having a second index value from the M CORESETs; based on the type of a search space of each of the CORESETs, select the N CORESETs from the M CORESETs, where a CORESET configured with a Common Search Space (CSS) configuration is prioritized with respect to a CORESET configured with a UE-specific Search Space (USS) configuration.

In some implementations, the monitoring module 520 is configured to perform at least one of the following in a case in which the number of CORESETs selected from the M CORESETs, based on the type of the search space of each of the CORESETs, is X, with M>X>N: based on the index value of each of the CORESETs, select the N CORESETs having the first index value from the X the CORESETs; based on the number of resources included in each of the CORESETs, select the N CORESETs with the highest number of resources from the X CORESETs; based on the index value of the SS associated with each of the CORESETs, select the N CORESETs associated with the SS having the second index value from the X CORESETs.

In some implementations, the monitoring module 520 is configured to select the N CORESETs from the Y CORESETs in predetermined priority orders, in a case in which the number of the CORESETs configured with the common search space configuration is Y in the M CORESETs, with M>Y>N. The predetermined priority orders include any one of the following: a first CORESET>a second CORESET>a third CORESET>a fourth CORESET>a fifth CORESET; the first CORESET>the third CORESET>the fourth CORESET>the second CORESET>the fifth CORESET; the first CORESET>the third CORESET>the second CORESET>the fourth CORESET>the fifth CORESET; where the first CORESET is a CORESET associated with Type OCSS. The second CORESET is a CORESET associated with Type 1 CSS. The third CORESET is a CORESET associated with Type 0ACSS. The fourth CORESET is a CORESET associated with Type 2 CSS. The fifth CORESET is a CORESET associated with Type 3 CSS.

In some implementations, the processor 610 is further configured to determine the available resource on the target monitoring resource based on the first information. The monitoring module is configured to monitor the PDCCH based on the available resource on the target monitoring resource.

In some implementations, the available resource is determined in any one of the following ways: Regarding the target monitoring resource, there is no unavailable resource in a predetermined number of consecutive resource blocks starting with a resource block with an index value of a, where a satisfies mod ($RB_{idx}$, b)=0, $RB_{idx}$ denotes an index value of the resource block, and b denotes the predetermined number. There is no unavailable resource in the target monitoring resource.

In some implementations, the monitoring module 520 is configured to determine a PDCCH candidate resource in the target monitoring resource based on a set of the available resources on the target monitoring resource, and monitoring the PDCCH based on the PDCCH candidate resource.

In some implementations, the monitoring module 520 is configured to monitor the PDCCH based on the PDCCH candidate resource if there is no RE as the unavailable resource in the PDCCH candidate resource; the PDCCH candidate resource is not monitored in a case there is the RE as the unavailable resource in the PDCCH candidate resource.

In some implementations, in a case in which at least a portion of the target monitoring resources corresponds to monitoring timing and/or a frequency domain resource whose transmission direction is downlink, at least a portion of the monitoring resources includes at least one of the following below: a CORESET with an index #0: a CORESET for beam failure recovery; a CORESET associated with a specified type CSS. The specified type CSS includes at least one of Type 0 CSS, Type 0A CSS, Type 1 CSS, and Type 2 CSS.

In some implementations, the direction information of the subband is indicated by high-layer signaling, MAC-CE, or Downlink Control Information (DCI).

The device 500 for monitoring the PDCCH in an embodiment of the present application can be a device, a device having an operating system or an electronic device having an operating system, a component in a terminal, an integrated circuit in a terminal or a chip in a terminal. The device or the electronic device can be a mobile terminal or can be a non-mobile terminal device. Exemplarily, the mobile terminal can include, but is not limited to, the type of terminal 11 listed above. The non-mobile terminal can be a server, a Network Attached Storage (NAS), a personal computer, a television, a teller machine, or a self-service machine, etc. An embodiment of the present application is not specifically limited. The operating system can be an Android operating system, can be an iOS operating system, or can be other possible operating systems, which is not specifically limited in an embodiment of the present application.

A device 600 for monitoring a PDCCH provided by an embodiment of the present application can implement each of the processes implemented by a terminal in the method embodiment of FIG. 2 to FIG. 4*a* and achieve the same technical effects. To avoid repetition, details are not described herein again.

Figure 6:
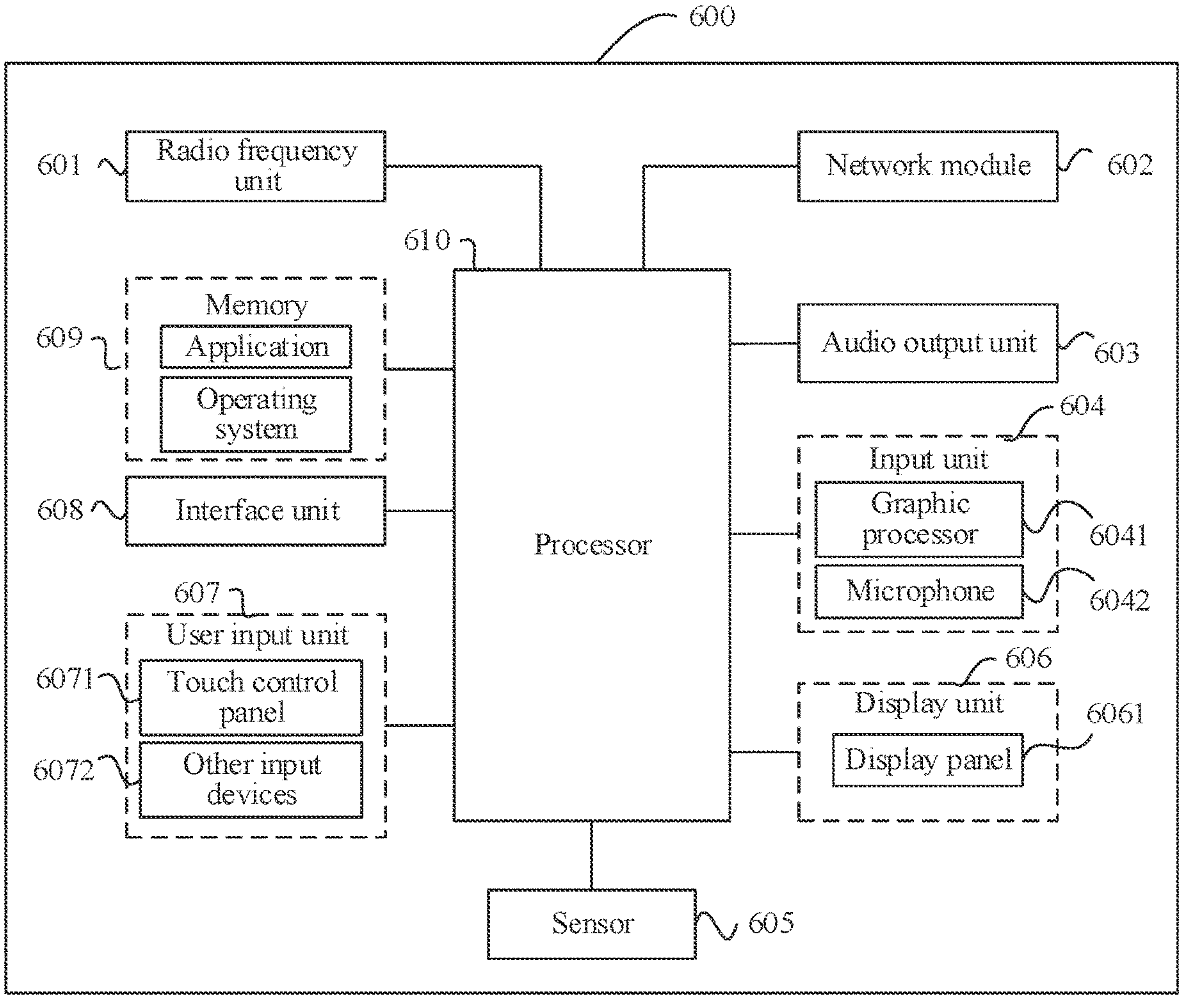
FIG. 6 is a block diagram of a terminal according to some embodiments of the present application.

An embodiment of the present application further provides a terminal, including a processor and a communication interface. The communication interface is coupled to the processor. The processor is configured to run a program or instructions to implement the methods of the foregoing method embodiments 200-400. The terminal embodiment corresponds to the method embodiment of the foregoing terminal side. Each of realization processes and realization methods of the foregoing method embodiments can be applied in the terminal embodiment and can achieve the same technical effect. In some implementations, FIG. 6 is a block diagram of a terminal according to an embodiment of the present application.

The terminal 600 includes, but is not limited to: at least a portion of components such as a radio frequency unit 601, a network module 602, an audio output unit 603, an input unit 604, a sensor 605, a display unit 606, a user input unit 607, an interface unit 608, a memory 609, and a processor 610.

A person skilled in the art can understand that the terminal 600 can further include a power supply (such as a battery) for supplying power to each of the components. The power supply can be logically connected to the processor 610 by a power management system, thereby implementing functions such as charging, discharging, and power consumption management by using the power management system. A terminal structure shown in FIG. 6 does not constitute a limitation on the terminal. The terminal can include more or fewer components than what are shown, or combine some components, or have different component arrangements. This is not repeated again.

It is to be understood in an embodiment of the present application that the input unit 604 can include a Graphics Processing Unit (GPU) 6041 and a microphone 6042. The graphics processing unit 6041 performs processing on image data of a static picture or a video that is obtained by an image acquisition device (for example, a camera) in a video acquisition mode or an image acquisition mode. The display unit 606 can include a display panel 6061. The display panel 6061 can be configured by using a Liquid Crystal Display (LCD), an Organic Light-Emitting Diode (OLED), or the like. In some implementations, the user input unit 607 includes a touch control panel 6071 and other input apparatus 6072. The touch control panel 6071 is also known as a touch screen. The touch control panel 6071 can include two parts of a touch detection device and a touch controller. Specifically, the other input apparatuses 6072 can include, but is not limited to, a physical keyboard, a functional key (such as a volume control key or a switch key), a track ball, a mouse, and a joystick, which are not repeated herein.

In some implementations, after the radio frequency unit 601 receives downlink data from a network side apparatus, the downlink data are sent to the processor 610 for processing. In addition, uplink data are sent to the network side apparatus. Generally, the radio frequency unit 601 includes, but is not limited to, an antenna, at least one amplifier, a transceiver, a coupler, a low noise amplifier, a duplexer, and the like.

The memory 609 can be configured to store a software program or instructions and various data. The memory 609 can mainly include a storage program or an instruction area and a data storage area. The storage program or the instruction area can store an operating system, an application program or instructions required by at least one function (such as a sound playback function and an image display function), and the like. In addition, the memory 609 can include a high-speed random access memory and may also include a non-volatile memory. The non-volatile memory can be a Read-Only Memory (ROM), a Programmable ROM (PROM), an Erasable PROM (EPROM), an Electrically EPROM (EEPROM), or a flash memory, such as at least one magnetic disk storage device, a flash memory or other volatile solid-state storage devices.

The processor 610 can include one or more processing units. In some implementations, the processor 610 can integrate an application processor and a modem processor. The application processor mainly processes an operating system, a user interface, an application program or the instructions, or the like. The modem processor mainly processes wireless communication such as a baseband processor. It can be understood that the foregoing modem processor cannot be integrated into the processor 610 either.

The processor 610, based on first information on a first time unit, determines a target monitoring resource for monitoring a PDCCH. The first information includes configuration information of a subband and/or configuration information of a guardband; The PDCCH is monitored based on the target monitoring resource.

In some implementations, the target monitoring resource includes a resource corresponding to at least one of a CORESET, a search space SS, and a search space set SS set.

In some implementations, the configuration information of the subband includes direction information and/or size information of the subband. The configuration information of the guardband includes position information and/or size information of the guardband.

In some implementations, the target monitoring resource satisfies at least one of the following: The target monitoring resource is not overlapped with a first subband. The first subband includes an uplink subband and/or a flexibly configured subband. The target monitoring resource is not overlapped with a first guardband.

In some implementations, the first subband and/or the first guardband are configured by a network side apparatus.

In some implementations, in cases in which the target monitoring resource includes the CORESET, and the terminal supports to monitor the PDCCH on the N CORESETs, but the target monitoring resource includes the M CORESETs, the processor 610 is configured to select the N CORESETs from the M CORESETs, where N<M. The processor 610 is configured to monitoring the PDCCH based on the N CORESETs.

In some implementations, the processor 610 is further configured to perform at least one of the following: based on an index value of each of the CORESETs, select the N CORESETs having a first index value from the M CORESETs: based on the number of resources included in each of the CORESETs, select the N CORESETs with the highest number of resources from the M CORESETs. The number of resources includes the number of resource block RBs and/or the number of symbols. based on an index value of a SS associated with each of the CORESETs, select the N CORESETs associated with the SS having a second index value from the M CORESETs; based on the type of a search space of each of the CORESETs, select the N CORESETs from the M CORESETs, where a CORESET configured with a Common Search Space (CSS) configuration is prioritized with respect to a CORESET configured with a UE-specific Search Space (USS) configuration.

In some implementations, the processor 610 is configured to perform at least one of the following in a case in which the number of CORESETs selected from the M CORESETs, based on the type of the search space of each of the CORESETs, is X, with M>X>N: based on the index value of each of the CORESETs, select the N CORESETs having the first index value from the X the CORESETs; based on the number of resources included in each of the CORESETs, select the N CORESETs with the highest number of resources from the X CORESETs; based on the index value of the SS associated with each of the CORESETs, select the N CORESETs associated with the SS having the second index value from the X CORESETs.

In some implementations, the processor 610 is configured to select the N CORESETs from the Y CORESETs in predetermined priority orders, in a case in which the number of the CORESETs configured with the common search space configuration is Y in the M CORESETs, with M>Y>N. The predetermined priority orders include any one of the following: a first CORESET>a second CORESET>a third CORESET>a fourth CORESET>a fifth CORESET; the first CORESET>the third CORESET>the fourth CORESET>the second CORESET>the fifth CORESET; the first CORESET>the third CORESET>the second CORESET>the fourth CORESET>the fifth CORESET; where the first CORESET is a CORESET associated with Type 0 CSS. The second CORESET is a CORESET associated with Type 1 CSS. The third CORESET is a CORESET associated with Type 0A CSS. The fourth CORESET is a CORESET associated with Type 2 CSS. The fifth CORESET is a CORESET associated with Type 3 CSS.

In some implementations, the processor 610 is further configured to determine the available resource on the target monitoring resource based on the first information, and monitor the PDCCH based on the available resource on the target monitoring resource.

In some implementations, the available resource is determined in any one of the following ways: Regarding the target monitoring resource, there is no unavailable resource in a predetermined number of consecutive resource blocks starting with a resource block with an index value of a, where a satisfies mod ($RB_{idx}$, b)=0, $RB_{idx}$ denotes an index value of the resource block, and b denotes the predetermined number. There is no unavailable resource in the target monitoring resource.

In some implementations, the processor 610 is configured to determine a PDCCH candidate resource in the target monitoring resource based on a set of the available resources on the target monitoring resource, and monitor the PDCCH based on the PDCCH candidate resource.

In some implementations, the processor 610 is configured to monitor the PDCCH based on the PDCCH candidate resource if there is no RE as the unavailable resource in the PDCCH candidate resource, The PDCCH candidate resource is not monitored in a case there is the RE as the unavailable resource in the PDCCH candidate resource.

In some implementations, in a case in which at least a portion of the target monitoring resources corresponds to monitoring timing and/or a frequency domain resource whose transmission direction is downlink, at least a portion of the monitoring resources includes at least one of the following below: a CORESET with an index #0; a CORESET for beam failure recovery; a CORESET associated with a specified type CSS. The specified type CSS includes at least one of Type 0 CSS, Type 0A CSS, Type 1 CSS, and Type 2 CSS.

In some implementations, the direction information of the subband is indicated by high-layer signaling, MAC-CE, or Downlink Control Information (DCI).

In the embodiment, the terminal determines the target monitoring resource for monitoring the PDCCH based on the configuration information of the subband on the first time unit and/or the configuration information of the guardband. Therefore, it is possible to enable the terminal to monitor the PDCCH based on the determined available target monitoring resource, avoiding the problem of not being able to monitor or transmit the PDCCH effectively due to the overlapping of the monitoring resource corresponding to the PDCCH with other resources other than the PDCCH, and ensuring wireless communication performance.

An embodiment of the present application further provides a computer-readable storage medium on which a computer program or instructions are stored. The computer program or the instructions, when executed by a processor, implement the processes of the foregoing method embodiments for monitoring the PDCCH and achieve the same technical effect, which is not described herein again to avoid repetition.

The processor is a processor in the terminal of the foregoing embodiments. The computer-readable storage medium includes a computer readable storage medium, for example, a Read-Only Memory (ROM), a Random Access Memory (RAM), a magnetic disk, an optical disc or the like.

An embodiment of the present application provides a chip, including a processor and a communication interface. The communication interface is coupled with the processor. The processor is configured to run a program or instructions of a network side apparatus to achieve the processes of the method embodiment for monitoring the PDCCH. The same technical effects can be achieved, which is not described in detail herein again to avoid repetition.

It should be understood that the chip referred to in an embodiment of the present application can also be referred to as a system-on-chip or the like.

An embodiment of the present application further provides a computer program product, including a processor, a memory, and a computer program or instructions stored on the memory and executed on the processor. When executed by the processor, the computer program or the instructions implement the processes of the method embodiment for monitoring the PDCCH, and can achieve the same technical effects. To avoid repetition, details are not described herein again.

The terms "include," "comprise" or any other variants thereof herein are intended to cover non-exclusive inclusion, so that a process, method, article or device including a series of elements not only include those elements, but also include other elements that are not explicitly listed, or also include elements inherent to the process, the method, the article or the device. Without more limitations, an element defined by the sentence "including one" does not exclude that there are still other same elements in a process, a method, an object, or a device. In addition, the scope of the method and the device in an embodiment of the present application is not limited to performing functions in an order shown or discussed, but can also include performing the functions in a substantially contemporaneous manner or in a reverse order according to the functions involved, e.g., the described method can be performed in a different order than what is described. Various steps can be added, omitted, or combined. In addition, features that are described by referring to some examples can also be combined in other examples.

Through the description of the foregoing embodiments, a person skilled in the art can clearly understand that the method of the foregoing embodiments can be implemented by using software and a necessary general hardware platform, and certainly, can also be implemented by hardware. Based on such an understanding, the technical solutions of the present application essentially, or a part contributing to the related art, can be presented in a form of a software product. The computer software product is stored in a storage medium (for example, a ROM/RAM, a magnetic disk, or an optical disc) including several instructions to enable a terminal (which can be a mobile phone, a computer, a server, an air-conditioner, a network device, or the like) to perform the method described in an embodiment of the present application.

An embodiment of the present application is described above with reference to the drawings. However, the present application is not limited to the specific embodiments described above. The specific embodiments described above are merely exemplary and not limitative. A person skilled in the art can make various forms under the motivation of the present application without departing from the spirit of the present application and the protection scope of the claims, and such forms shall all fall within the protection scope of the present application.

What is claimed is:

1. A method for monitoring a Physical Downlink Control CHannel (PDCCH), comprising:

determining, by a terminal, a target monitoring resource for monitoring the PDCCH based on first information on a first time unit, wherein the first information comprises configuration information of a guardband; and monitoring the PDCCH based on the target monitoring resource, wherein the target monitoring resource satisfies that the target monitoring resource is not overlapped with a first guardband, wherein the target monitoring resource further satisfies that the target monitoring resource is not overlapped with a first subband, and the first subband comprises an uplink subband or a flexibly configured subband, and wherein the target monitoring resource comprises a resource corresponding to a Control REsource SET (CORESET), and monitoring the PDCCH based on the target monitoring resource further comprises:

when the terminal supports monitoring the PDCCH on N CORESETs, but the target monitoring resource comprises M CORESETs, selecting the N CORESETs from the M CORESETs, wherein N<M; and monitoring the PDCCH based on the N CORESETs, wherein selecting the N CORESETs from the M CORESETs comprises:

based on a type of a Search Space (SS) of each of the M CORESETs, selecting the N CORESETs from the M CORESETs, wherein a CORESET configured with a Common Search Space (CSS) configuration is prioritized with respect to a CORESET configured with a UE-specific Search Space (USS) configuration, and wherein selecting the N CORESETs from the M CORESETs based on the type of the SS of each of the M CORESETs comprises:

when the number of CORESETs configured with a CSS configuration in the M CORESETs is Y, and M>Y>N, selecting the N CORESETs from the Y CORESETs in predetermined priority orders, wherein the predetermined priority orders comprise any one of the following:

a first CORESET>a second CORESET>a third CORESET>a fourth CORESET>a fifth CORESET;

the first CORESET>the third CORESET>the fourth CORESET>the second CORESET>the fifth CORESET; or the first CORESET>the third CORESET>the second CORESET>the fourth CORESET>the fifth CORESET, wherein the first CORESET is a CORESET associated with Type 0 CSS, the second CORESET is a CORESET associated with Type 1 CSS, the third CORESET is a CORESET associated with Type OA CSS, the fourth CORESET is a CORESET associated with Type 2 CSS, and the fifth CORESET is a CORESET associated with Type 3 CSS.

2. The method according to claim 1, wherein the target monitoring resource further comprises a resource corresponding to at least one of a Search Space (SS), or an SS set.

3. The method according to claim 1, wherein the configuration information of the guardband comprises position information or size information of the guardband.

4. The method according to claim 1, wherein the first information further comprises configuration information of a subband, the configuration information of the subband comprises direction information or size information of the subband.

5. The method according to claim 1, wherein the first subband or the first guardband is configured by a network side apparatus.

6. The method according to claim 1, wherein selecting the N CORESETs from the M CORESETs further comprises at least one of the following:

based on an index value of each of the M CORESETs, selecting the N CORESETs having a first index value from the M CORESETs;

based on the number of resources comprised in each of the M CORESETs, selecting the N CORESETs with the highest number of resources from the M CORESETs, wherein the number of resources comprises the number of Resource Blocks (RBs) or the number of symbols; or based on an index value of the SS associated with each of the M CORESETs, selecting the N CORESETs associated with the SS having a second index value from the M CORESETs.

7. The method according to claim 1, wherein before monitoring the PDCCH based on the target monitoring resource, the method further comprises:

determining, based on the first information, an available resource on the target monitoring resource, wherein monitoring the PDCCH based on the target monitoring resource comprises:

monitoring the PDCCH based on the available resource on the target monitoring resource.

8. The method according to claim 7, wherein the available resource is determined in any one of the following:

regarding the target monitoring resource, no unavailable resource is disclosed in a predetermined number of consecutive Resource Blocks (RBs) starting with a RB with an index value of a, wherein a satisfies mod $(RB_{idx}, b)=0$, $RB_{idx}$ denotes an index value of the RB, and b denotes the predetermined number; or no unavailable resource is disclosed in the target monitoring resource.

9. The method according to claim 7, wherein monitoring the PDCCH based on the available resource on the target monitoring resource comprises:

determining a PDCCH candidate resource in the target monitoring resource based on a set of the available resources on the target monitoring resource; and monitoring the PDCCH based on the PDCCH candidate resource.

10. The method according to claim 9, wherein monitoring the PDCCH based on the PDCCH candidate resource comprises:

when no Resource Element (RE) as an unavailable resource is disclosed in the PDCCH candidate resource, monitoring the PDCCH based on the PDCCH candidate resource, wherein the PDCCH candidate resource is not monitored when there is an RE as the unavailable resource in the PDCCH candidate resource.

11. The method according to claim 1, wherein when at least a portion of the target monitoring resources corresponds to monitoring timing or a frequency domain resource whose transmission direction is downlink, at least a portion of the monitoring resources comprises at least one of the following:

a COntrol REsource SET (CORESET) with an index #0;

a CORESET for beam failure recovery; or a CORESET associated with a specified type Common Search Space (CSS), wherein the specified type CSS comprises at least one of Type 0 CSS, Type OA CSS, Type 1 CSS, or Type 2 CSS.

12. The method according to claim 1, wherein the direction information of the subband is indicated by high-layer signaling, Media Access Control-Control Element (MAC-CE), or Downlink Control Information (DCI).

13. A terminal, comprising:

a memory storing computer-readable instructions; and a processor coupled to the memory and configured to execute the computer-readable instructions, wherein the computer-readable instructions, when executed by the processor, cause the processor to perform operations comprising:

determining a target monitoring resource for monitoring a Physical Downlink Control CHannel (PDCCH) based on first information on a first time unit, wherein the first information comprises configuration information of a guardband; and monitoring the PDCCH based on the target monitoring resource, wherein the target monitoring resource satisfies that the target monitoring resource is not overlapped with a first guardband, wherein the target monitoring resource further satisfies that the target monitoring resource is not overlapped with a first subband, and the first subband comprises an uplink subband or a flexibly configured subband, and wherein the target monitoring resource comprises a resource corresponding to a Control REsource SET (CORESET), and monitoring the PDCCH based on the target monitoring resource further comprises:

when the terminal supports monitoring the PDCCH on N CORESETs, but the target monitoring resource comprises M CORESETs, selecting the N CORESETs from the M CORESETs, wherein $N<M$; and monitoring the PDCCH based on the N CORESETs, wherein selecting the N CORESETs from the M CORESETs comprises:

based on a type of a Search Space (SS) of each of the M CORESETs, selecting the N CORESETs from the M CORESETs, wherein a CORESET configured with a Common Search Space (CSS) configuration is prioritized with respect to a CORESET configured with a UE-specific Search Space (USS) configuration, and wherein selecting the N CORESETs from the M CORESETs based on the type of the SS of each of the M CORESETs comprises:

when the number of CORESETs configured with a CSS configuration in the M CORESETs is Y, and M>Y>N, selecting the N CORESETs from the Y CORESETs in predetermined priority orders, wherein the predetermined priority orders comprise any one of the following:

a first CORESET>a second CORESET>a third CORESET>a fourth CORESET>a fifth CORESET;

the first CORESET>the third CORESET>the fourth CORESET>the second CORESET>the fifth CORESET; or the first CORESET>the third CORESET>the second CORESET>the fourth CORESET>the fifth CORESET, wherein the first CORESET is a CORESET associated with Type 0 CSS, the second CORESET is a CORESET associated with Type 1 CSS, the third CORESET is a CORESET associated with Type OA CSS, the fourth CORESET is a CORESET associated with Type 2 CSS, and the fifth CORESET is a CORESET associated with Type 3 CSS.

14. The terminal according to claim 13, wherein the target monitoring resource further comprises a resource corresponding to at least one of a Search Space (SS), or an SS set.

15. The terminal according to claim 13, wherein the configuration information of the guardband comprises position information or size information of the guardband.

16. The terminal according to claim 14, wherein the first information further comprises configuration information of a subband, the configuration information of the subband comprises direction information or size information of the subband.

17. A non-transitory computer-readable medium storing instructions that, when executed by a processor, cause the processor to perform operations comprising:

determining a target monitoring resource for monitoring a Physical Downlink Control CHannel (PDCCH) based on first information on a first time unit, wherein the first information comprises configuration information of a guardband; and monitoring the PDCCH based on the target monitoring resource, wherein the target monitoring resource satisfies that the target monitoring resource is not overlapped with a first guardband, wherein the target monitoring resource further satisfies that the target monitoring resource is not overlapped with a first subband, and the first subband comprises an uplink subband or a flexibly configured subband, and wherein the target monitoring resource comprises a resource corresponding to a Control REsource SET (CORESET), and monitoring the PDCCH based on the target monitoring resource further comprises:

when the terminal supports monitoring the PDCCH on N CORESETs, but the target monitoring resource comprises M CORESETs, selecting the N CORESETs from the M CORESETs, wherein N<M; and monitoring the PDCCH based on the N CORESETs, wherein selecting the N CORESETs from the M CORESETs comprises:

based on a type of a Search Space (SS) of each of the M CORESETs, selecting the N CORESETs from the M CORESETs, wherein a CORESET configured with a Common Search Space (CSS) configuration is prioritized with respect to a CORESET configured with a UE-specific Search Space (USS) configuration, and wherein selecting the N CORESETs from the M CORESETs based on the type of the SS of each of the M CORESETs comprises:

when the number of CORESETs configured with a CSS configuration in the M CORESETs is Y, and M>Y>N, selecting the N CORESETs from the Y CORESETs in predetermined priority orders, wherein the predetermined priority orders comprise any one of the following:

a first CORESET>a second CORESET>a third CORESET>a fourth CORESET>a fifth CORESET;

the first CORESET>the third CORESET>the fourth CORESET>the second CORESET>the fifth CORESET; or the first CORESET>the third CORESET>the second CORESET>the fourth CORESET>the fifth CORESET, wherein the first CORESET is a CORESET associated with Type 0 CSS, the second CORESET is a CORESET associated with Type 1 CSS, the third CORESET is a CORESET associated with Type OA CSS, the fourth CORESET is a CORESET associated with Type 2 CSS, and the fifth CORESET is a CORESET associated with Type 3 CSS.

* * * * *